April 15, 1969   C. B. CAPERTON   3,438,079
TUBULAR SCREW DRIVE FOR A RODDING MACHINE
Filed Nov. 30, 1967   Sheet 1 of 2

INVENTOR.
Charles B. Caperton

BY

Paul & Paul
ATTORNEYS.

INVENTOR.
Charles B. Caperton

BY

Paul + Paul
ATTORNEYS.

United States Patent Office 3,438,079
Patented Apr. 15, 1969

3,438,079
TUBULAR SCREW DRIVE FOR A RODDING MACHINE
Charles B. Caperton, Montgomery Court Apartments, Narberth, Pa. 19072
Filed Nov. 30, 1967, Ser. No. 686,910
Int. Cl. B08b *1/02;* B65h *17/20*
U.S. Cl. 15—104.3                            4 Claims

ABSTRACT OF THE DISCLOSURE

A tubular screw drive for a rodding machine for coupled rod is disclosed in which pusher dogs for the couplers are carried on an endless belt and are provided with lateral ears which engage and are moved along by the helical screw thread of the internally-threaded rotationally-driven elongated tube through which the coupled rod passes.

CROSS REFERENCES TO RELATED APPLICATION

The tubular screw drive of the present application represents a modification of the twin screw drive disclosed and claimed in applicant's U.S. Patent 3,146,476, granted Sept. 1, 1964, and entitled "Screw Drive for Rodding Machine."

FIELD OF THE INVENTION

This invention relates to rodding machines for handling coupled rod of the type used in sewer cleaning and clearing. More particularly, the invention relates to the drive for such a rodding machine.

DESCRIPTION OF THE PRIOR ART

A coupled rod of the type used in sewer cleaning and clearing is composed of a large number of individual sections of spring steel rod coupled together end-to-end by couplers. One form of rodding machine for driving the coupled rod is shown in Ciaccio U.S. Patent 2,544,256. In the Ciaccio patent, the coupled rod is pushed axially by means of pusher blocks or dogs mounted on or carried by an endless chain which is driven by a suitable sprocket transmission. The dogs have a yoke portion which straddles the rod and, when a dog carried along by the endless chain comes into engagement with one of the couplers, it pushes the coupler along, thereby advancing the rod in its axial direction. The direction of movement of the endles chain is reversible, the rod being moved in one direction or the other according to the direction of movement of the endless chain. When the tool at the forward end of the rod meets a particularly heavy obstruction, the load on the sprocket and chain transmission becomes great and operation of the drive is sometimes unsatisfactory.

In applicant's U.S. Patent 3,146,476, a screw form of drive is disclosed which provides a strong positive drive which assures satisfactory operation despite the heavy loads which may be encountered. A pair of parallel spaced-apart driven helical screws are provided which form between them a passageway through which the coupled rod is passed. The pusher dogs are provided with opposing lateral projections or ears which engage and are moved along by the screws.

SUMMARY OF THE INVENTION

In lieu of the twin screws shown in applicant's U.S. Patent 3,146,476, the present application discloses the employment of a single screw in the form of an internally-threaded rotationally-driven tubular structure through which the coupled rod is passed. The laterally projecting ears of the pusher dogs are engaged by the threads of the screw on opposite sides of the rotational tube, and by this means the dogs are carried forward pushing the rod couplers ahead of them. Guide means are provided in the tube for preventing twisting of the dogs about the axis of the rod.

DESCRIPTION OF THE PREFERRED EMBODIMENTS

Figure 1:
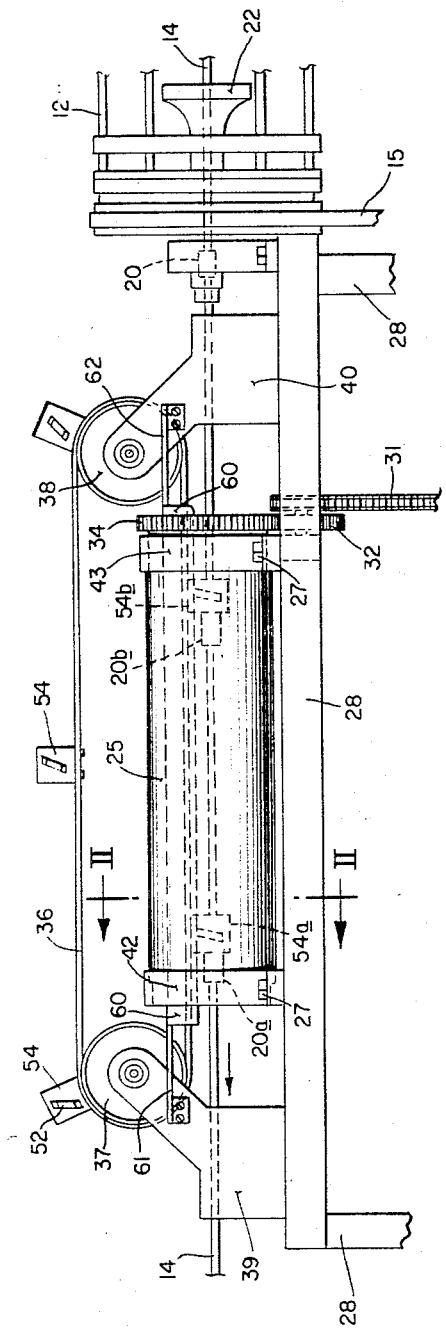
FIG. 1 is a side elevational diagrammatic view of the drive portion of a rodding machine showing the internally-threaded tubular screw drive of the present invention.

In FIG. 1 is shown a fragmentary view of a known form of reel or cage 12 of a rodding machine in which the coupled rod 14 is stored in coiled form. The reel or cage 12 is driven rotationally, as by the V-belt 15, in one direction to turn the tool at the forward end of the coupled rod into the obstruction and in the opposite direction to turn the tool out of the obstruction. The cage is not ordinarily rotated during feeding out or reeling in of the rod.

The sectional or coupled rod 14 may be assumed to comprise a plurality of individual spring steel rods each having a length, for example, of 39″ or 48″, coupled together end-to-end by the couplers 20. The couplers 20 may be of the type shown in Crane Patent 2,152,636. A flared guide funnel 22 guides the coupled rod from the cage 12 into the drive head portion of the rodding machine during feed-out, and guides the rod into the cage during reeling in.

Figure 2:
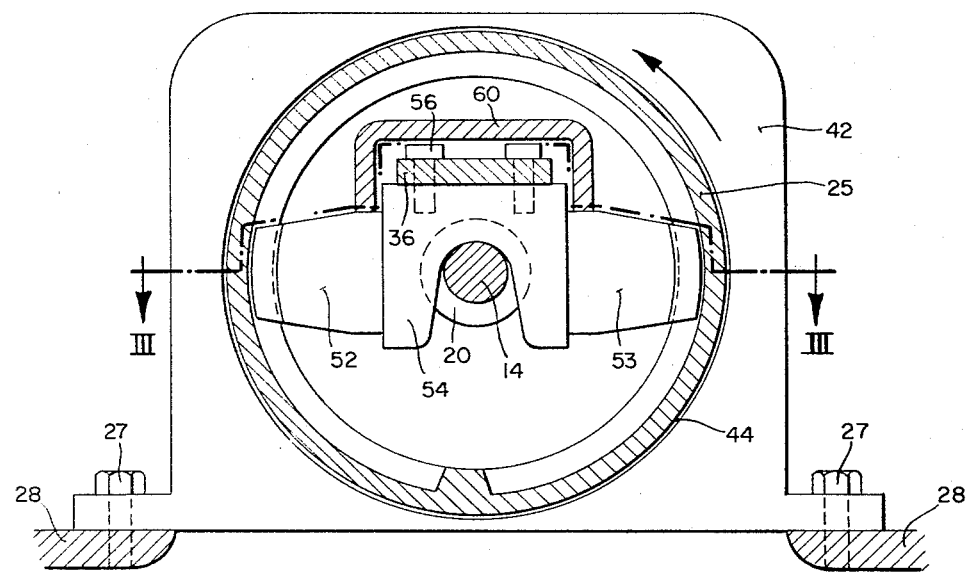
FIG. 2 is a view, in section, along the line II—II of FIG. 1 looking in the direction of the arrow.
Figure 3:
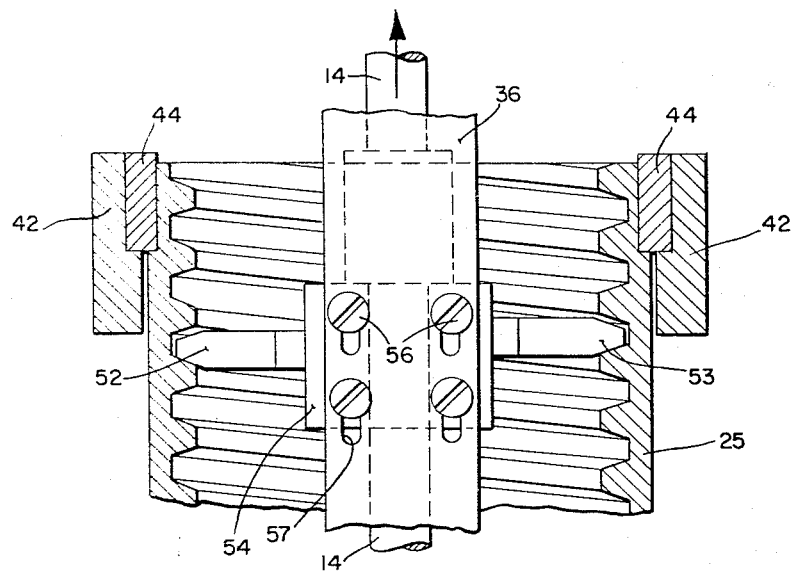
FIG. 3 is a sectional view along the line III—III of FIG. 2 looking down on the push dog and internally-threaded tubular screw.

In accordance with my present invention, and as illustrated in FIGS. 1, 2 and 3, the drive head of the rodding machine comprises an elongated internally-threaded tubular screw 25 which is journalled at each end for rotation in annular bearings 44 and 45 mounted in bearing blocks 42 and 43, respectively, secured as by bolts 27 to the frame 28 of the rodding machine.

The tubular screw 25 has a length greater than the spacing between the couplers 20, and may be driven rotationally by any suitable means. In the drawings, the screw 25 is shown as being driven by the chain drive 31 which drives the pinion 32 which is in engagement with and drives the annular gear 34 fixed to one end of the tubular screw 25.

An endless belt 36 or other suitable material is supported by idler pulleys 37 and 38 which are mounted for rotation in the support arms 39 and 40 mounted on the frame 28. One leg of the endless belt 36 passes through the tubular screw 25. An inverted guide channel 60 extends through the tubular screw 25 and is supported at each end by the extensions 61 and 62, respectively, which are bolted to the support arms 39 and 40. The guide channel 60 prevents rotation of the pusher dogs 54 which are secured at spaced intervals to the belt 36. The spacing between the pusher dogs 54 is made substantially equal to the spacing between the couplers 20 of the coupled rod 14.

Since the tubular screw 25 is longer than the spacing between the pusher dogs 54 at least one dog 54 is always in mesh with the helical threads of the tubular screw. Thus, a following dog, such as 54b, enters the threads of the tubular screw 25 before the preceding dog, such as 54a, arrives at the exit end of the tubular screw. The pusher-dog ears 52 and 53, on opposite sides of the pusher dogs, are slightly off-set, as seen in FIG. 3, so as to be in alignment with the oppositely-positioned threads of the screw 25.

In the ideal situation, each of the two dogs, such as 54a, 54b, which are in the tubular screw drive 25 at the same time, will be in contact with a coupler 20 and pushing it along. As a practical matter, in some instances at least, due to a slight bend in the rod 14, or to manufacturing tolerances, or to other causes, the difference between consecutive dogs, such as 54a, 54b, may be slightly greater than the distance between consecutive couplers 20, such as 20a, 20b, so that the following dog 54b does not always make physical contact with its coupler 20b. Also, the ears 52, 53 of the following dog 54b may be centered in the groove of the threads of the helical screw 25 and may not be in contact with the wall of the helical thread. In such case, the screw drive does not exert any drive force on the second dog 54b so long as the preceding dog 54a is being pushed along by the screw drive, and the second dog 54b will be merely carried along by the moving belt 36. It will be understood that the belt is being moved forward by the movement of the preceding dog 54a which is being driven by the screw. When the preceding or front dog 54a reaches the exit end of the tubular screw drive, the force which had been driving the front dog ceases, and the endless belt 36 momentarily stops moving. As the tubular screw drive 25 continues to rotate, the forward wall of the helical threads move against the projecting ears 52, 53 of the second dog 54b (which for purposes of this discussion had been assumed to be centered in the groove) and the threads now exert a forward force against the ears. This moves the second dog 54b forward and closes any gap which may have existed between the dog 54b and the coupler 20b immediately thereahead. The continued forward movement of the dog 54b drives the rod 14 and the endless belt 36 forward.

In order to allow the second or following dog 54b to move up and close any slight gap which may have existed between it and the coupler 20b ahead of it when the front dog 54a alone was providing the drive force on the coupled rod, slots 57 are provided in the endless belt 36 for each of the four fastening screws 56 which secure the dog to the belt. These slots allow the front or forward dog 54a to move rearward relative to the belt 36 and thus avoid any tendency to wrinkle the belt when the belt is moved forward by the second or following dog 54b when the latter dog takes over the drive. As the second or following dog 54b continues to be moved forward through the tubular screw by the drive action of the tubular screw drive, the carrier belt 36 is driven forward and the front or preceding dog 54a is carried along beyond the exit end of the screw drive. As indicated previously, before each driving dog reaches the exit end of the tubular screw drive a following dog arrives at the entrance end and its opposing ears enter the grooves of the helical threads.

In the foregoing discussion, it has been assumed that the rod is being pulled out of the cage 12, and is moving from right to left as viewed in FIG. 1. The tubular screw drive is, of course, reversible. In the reverse direction, the screw drive operates in substantially the same way to return the coupled rod to the cage. At the time of reversal there is a slight delay in rod movement awaiting travel of the dog in the screw drive through the spacing between the couplers.

While the preferred embodiment of this invention has been described in some detail, it will be obvious to one skilled in the art that various modifications may be made without departing from the invention as hereinafter claimed.

Having described my invention, I claim:

1. In a rodding machine for handling rod comprising individual sections of rod coupled end-to-end by couplers, drive means for driving the rod in its axial direction, said drive means comprising:
    (a) an elongated internally-threaded tubular member through the bore of which the coupled rod is passed, the length of said tubular member being greater than the spacing between couplers;
    (b) means mounting said tubular member for axial rotation on said machine;
    (c) means connected to said tubular member for driving said member rotationally;
    (d) an endless loop conveyor having a leg threaded through the bore of said tubular members; and
    (e) a plurality of pusher dogs mounted at spaced intervals on said conveyor, the spacing between dogs being less than the length of said tubular member, each dog being provided with laterally protruding opposing ears, said ears adapted to be engaged by the threads of said tubular member to move said dogs through said tubular member when said member is rotated.

2. Apparatus as claimed in claim 1 characterized in that the spacing between the dogs on said conveyor is approximately equal to the distance between the couplers on said rod.

3. Apparatus as claimed in claim 2 further characterized in that said endless conveyor is mounted on a pair of spaced-apart idler pulleys mounted on said machine.

4. Apparatus as claimed in claim 3 further characterized in that a guide channel for said belt and dogs extends through the interior of said tubular member for preventing rotation of said dogs.

References Cited

UNITED STATES PATENTS 3,146,476   9/1964   Caperton.

EDWARD L. ROBERTS, *Primary Examiner.*

U.S. Cl. X.R.

226—173, 188